United States Patent
Yano et al.

(10) Patent No.: US 7,517,937 B2
(45) Date of Patent: Apr. 14, 2009

(54) BIODEGRADABLE RESIN COMPOSITION AND BIODEGRADABLE RESIN MOLDED ARTICLE

(75) Inventors: Toru Yano, Hiroshima (JP); Nobuyuki Sakuda, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 236 days.

(21) Appl. No.: 10/787,415

(22) Filed: Feb. 27, 2004

(65) Prior Publication Data
US 2004/0224123 A1  Nov. 11, 2004

(30) Foreign Application Priority Data

| May 8, 2003 | (JP) | P.2003-130364 |
| Jun. 27, 2003 | (JP) | P.2003-184899 |
| Dec. 10, 2003 | (JP) | P.2003-411647 |

(51) Int. Cl.
  *C08L 67/00* (2006.01)
(52) U.S. Cl. ............... 525/411; 525/54.2; 525/418; 525/450; 523/124
(58) Field of Classification Search ........... 525/411, 525/54.2, 418, 450; 523/124
See application file for complete search history.

(56) References Cited

U.S. PATENT DOCUMENTS

| 4,481,353 | A | * | 11/1984 | Nyilas et al. ............ 528/303 |
| 5,593,778 | A | * | 1/1997 | Kondo et al. ............ 428/373 |
| 5,686,540 | A | * | 11/1997 | Kakizawa ............... 525/444 |
| 6,140,458 | A | * | 10/2000 | Terado et al. ............ 528/272 |
| 6,174,602 | B1 | * | 1/2001 | Matsui et al. ............ 428/373 |
| 6,645,618 | B2 | * | 11/2003 | Hobbs et al. ............ 428/359 |
| 6,869,985 | B2 | * | 3/2005 | Mohanty et al. .......... 523/124 |
| 6,881,876 | B2 | * | 4/2005 | Nurmi et al. ............. 604/370 |
| 6,984,443 | B2 | * | 1/2006 | Kuroki et al. ............ 428/220 |

FOREIGN PATENT DOCUMENTS

| JP | 08073628 A | * | 3/1996 |
| JP | 10-20/4157 A | | 8/1998 |
| JP | 2003-96285 A | | 4/2003 |
| JP | 2003096285 A | * | 4/2003 |
| WO | WO 03006550 A1 | * | 1/2003 |

OTHER PUBLICATIONS

JP 2003-096285, Kumazawa et al. Apr. 2003, English Translation obtained from JPO Web-site.*
JP 08073628 A-English translation of abstract.*
Japanese Office Action dated Aug. 10, 2005, with one-page partial translation.

* cited by examiner

*Primary Examiner*—Randy Gulakowski
*Assistant Examiner*—Alicia M Toscano
(74) *Attorney, Agent, or Firm*—Sughrue Mion, PLLC

(57) ABSTRACT

The present invention relates a biodegradable resin composition comprising an L-lactic acid unit-containing resin (1) and a D-lactic acid unit-containing resin (2). Also disclosed is a biodegradable resin molded article obtained from the biodegradable resin composition.

Figure 1:
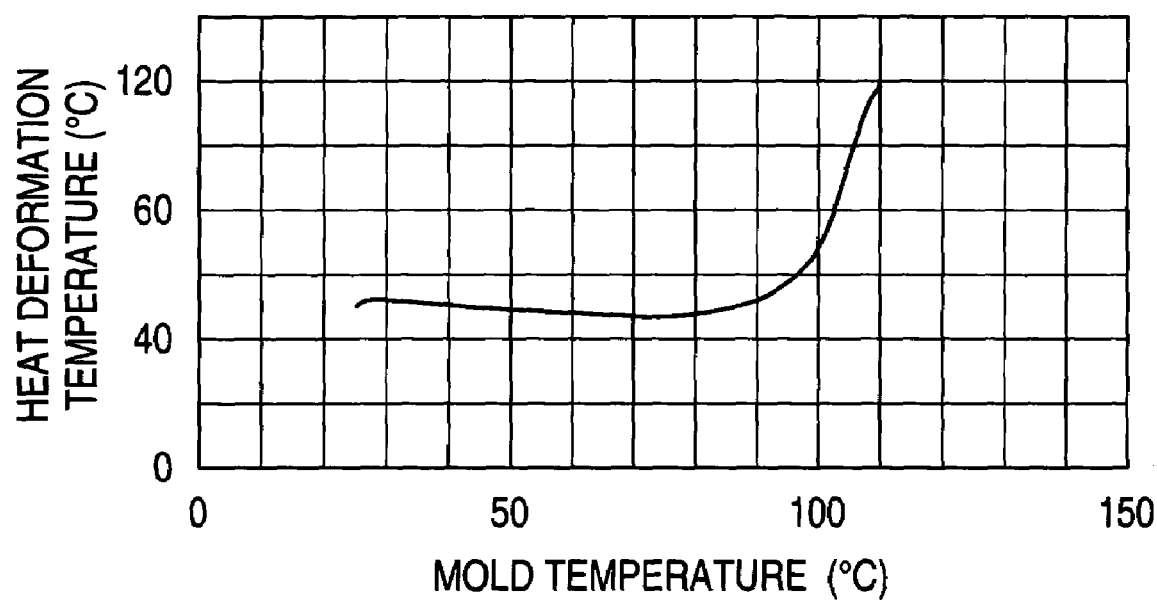

5 Claims, 1 Drawing Sheet

BIODEGRADABLE RESIN COMPOSITION AND BIODEGRADABLE RESIN MOLDED ARTICLE

FIELD OF THE INVENTION

The present invention relates to a biodegradable resin composition, more specifically, to a biodegradable resin composition which has an excellent heat resistance and whose biodegradation rate and melt viscosity can be controlled. In addition, the invention also relates to a biodegradable resin molded article obtainable by injection molding of the biodegradable resin composition.

BACKGROUND OF THE INVENTION

Heretofore, a large number of various plastic products which utilizes the characteristics of light weight, excellent processability, and resistance to corrosion and degradation have been commercially available and widely employed in human life and various industrial fields. On the other hand, corresponding to such circumstances, there is a tendency that the waste amount of the above plastic products after use has been increasing year by year. In addition, since the plastic products are substances resistant to corrosion and degradation, the waste products have caused a big problem of environmental pollution.

In response to such situation, instead of the above plastic products resistant to corrosion and degradation, various biodegradable resins easily degraded finally to water and carbon dioxide by organisms present in nature, especially microorganisms in soil and water have been developed and attracted attention as environmentally sound products.

A process for producing a polyhydroxy carboxylic acid as a biodegradable resin is disclosed in the Patent Document 1 specified below.

Patent Document 1: JP 10-204157 A

SUMMARY OF THE INVENTION

Recently, the application range of biodegradable resins has been diversified and in particular, further improvement of heat resistance thereof has been required in this field.

Therefore, an object of the invention is to provide a biodegradable resin composition which has an excellent heat resistance and whose biodegradation rate and melt viscosity can be controlled.

Another object of the invention is to provide a biodegradable resin molded article obtainable by injection molding of the biodegradable resin composition.

As a result of extensive studies, the present inventors found that the above-described objects can be achieved by providing the following compositions and molded articles.

1. A biodegradable resin composition comprising an L-lactic acid unit-containing resin (1) and a D-lactic acid unit-containing resin (2).
2. The biodegradable resin composition according to the above item 1, wherein the L-lactic acid unit-containing resin (1) is a copolymer resin containing an L-lactic acid unit, and wherein the D-lactic acid unit-containing resin (2) is a copolymer resin containing a D-lactic acid unit.
3. The biodegradable resin composition according to the above item 1 or 2, wherein the L-lactic acid unit-containing resin (1) is a copolymer resin obtainable by copolymerizing at least L-lactic acid, a polyhydric alcohol and a polybasic carboxylic acid, and wherein the D-lactic acid unit-containing resin (2) is a copolymer resin obtainable by copolymerizing at least D-lactic acid, a polyhydric alcohol and a polybasic carboxylic acid.
4. The biodegradable resin composition according to the above item 3, wherein either or both of the polyhydric alcohols used for resins (1) and (2) is polypropylene glycol.
5. The biodegradable resin composition according to the above item 3, wherein either or both of the polybasic carboxylic acids used for resins (1) and (2) is citric acid.
6. The biodegradable resin composition according to the above item 1 or 2, wherein the L-lactic acid unit-containing resin (1) is a copolymer resin obtainable by copolymerizing at least L-lactic acid and a saccharide, and wherein the D-lactic acid unit-containing resin (2) is a copolymer resin obtainable by copolymerizing at least D-lactic acid and a saccharide.
7. The biodegradable resin composition according to the above item 6, wherein either or both of the saccharides used for resins (1) and (2) is starch.
8. The biodegradable resin composition according to any one of the above items 1 to 7, wherein the D-lactic acid unit-containing resin (2) is mixed in an amount of 1 to 100 parts by weight relative to 100 parts by weight of the L-lactic acid unit-containing resin (1).
9. A biodegradable resin molded article, which is obtainable by injecting a biodegradable resin composition according to any one of the above items 1 to 8 into a heated mold having a predetermined shape.
10. The biodegradable resin molded article according to the above item 9, wherein the heating mold has a heating temperature of 90 to 130° C.

According to the above constitution, there are provided a biodegradable resin composition which has an excellent heat resistance and whose biodegradation rate and melt viscosity can be controlled, and a biodegradable resin molded article.

BRIEF DESCRIPTION OF THE INVENTION

FIG. 1 is a drawing illustrating the relationship between mold temperature and heat deformation temperature in Example 7.

DETAILED DESCRIPTION OF THE INVENTION

The present invention is described in more detail below.

As mentioned above, the biodegradable resin composition of the invention has a feature that the composition comprises an L-lactic acid unit-containing resin (1) and a D-lactic acid unit-containing resin (2). In this connection, in the following description, the L-lactic acid unit-containing resin (1) and the D-lactic acid unit-containing resin (2) are sometimes simply referred to as resin (1) and resin (2), respectively.

L-Lactic acid and D-lactic acid for use in the invention are easily commercially available and any of commercial products having a purity of 50% to 95% can be used but easily available 90% lactic acid is preferred.

The L-lactic acid unit-containing resin (1) and the D-lactic acid unit-containing resin (2) in the invention can be a homopolymer of L-lactic acid and a homopolymer of D-lactic acid, respectively, but they may be copolymer resins.

Specifically, according to a first embodiment of the invention, it is preferred that the resin (1) is a copolymer resin obtainable by copolymerizing at least D-lactic acid, a polyhydric alcohol and a polybasic carboxylic acid, and the resin (2) is a copolymer resin obtainable by copolymerizing at least D-lactic acid, a polyhydric alcohol and a polybasic carboxylic acid.

Moreover, according to a second embodiment of the invention, it is preferred that the resin (1) is a copolymer resin obtainable by copolymerizing at least L-lactic acid and a saccharide, and the resin (2) is a copolymer resin obtainable by copolymerizing at least D-lactic acid and a saccharide.

According to these embodiments, it is possible to impart particularly flexibility to the resulting resin compositions.

First, the first embodiment of the invention, i.e., the embodiment wherein the resin (1) is a copolymer resin obtainable by copolymerizing at least D-lactic acid, a polyhydric alcohol and a polybasic carboxylic acid, and the resin (2) is a copolymer resin obtainable by copolymerizing at least D-lactic acid, a polyhydric alcohol and a polybasic carboxylic acid, is described.

In the resins (1) and (2), examples of the polyhydric alcohol include polyvinyl alcohol, glycerin, polyethylene glycol, and polypropylene glycol, and of these, preferred is polypropylene glycol which is capable of reducing hygroscopicity of the resulting resin. In this case, the weight average molecular weight of the polypropylene glycol is preferably 1,000 to 3,000.

In the resins (1) and (2), the polybasic carboxylic acid is not particularly limited as far as it is a compound having two or more carboxyl groups, and examples thereof include citric acid, malic acid and succinic acid, and of these, preferred is citric acid.

Moreover, in the first embodiment, the use amount ratio of L- or D-lactic acid is preferably 50 to 99.99% by weight relative to the resin (1) or (2), respectively. By making the use amount ratio of L- or D-lactic acid 50% by weight or more, the mechanical strength and heat resistance can be improved. Also, by making the use amount ratio of L- or D-lactic acid 99.99% by weight or less, the decrease of the biodegradation rate can be prevented.

In the resins (1) and (2), the use amount ratio of the polyhydric alcohol is preferably 1 to 50% by weight. By making the use amount ratio of the polyhydric alcohol 1% by weight or more, the control of the biodegradation rate and melt viscosity are facilitated. Also, by making the use amount ratio of the polyhydric alcohol 50% by weight or less, the resin strength can be enhanced.

In the resins (1) and (2), the use amount ratio of the polybasic acid is preferably 0.1 to 20% by weight. By making the use amount ratio of the polybasic acid 0.1% by weight or more, the control of the biodegradation rate and melt viscosity are facilitated. Also, by making the use amount ratio of the polybasic acid 20% by weight or less, the resin strength can be further enhanced.

In this connection, in the resins (1) and (2), the kinds of the polyhydric alcohol and the polybasic acid may be the same or different from each other.

Next, the second embodiment of the invention, i.e., the embodiment wherein the L-lactic acid unit-containing resin (1) is a copolymer resin obtainable by copolymerizing at least L-lactic acid and a saccharide, and the D-lactic acid unit-containing resin (2) is a copolymer resin obtainable by copolymerizing at least D-lactic acid and a saccharide, is described.

As the L-Lactic acid and D-lactic acid for use in the second embodiment, any of commercial products having a purity of 50% to 95% can be utilized but easily available 90% lactic acid is preferred.

Moreover, the saccharide for use in the resins (1) and (2) is not particularly limited and examples thereof include starch, glucose, sucrose and cellulose acetate, and of these, starch is preferred in view of material cost and reactivity.

In the second embodiment, the use amount ratio of L- or D-lactic acid is preferably 30 to 99% by weight relative to the resin (1) or (2), respectively. By making the use amount ratio of L- or D-lactic acid 30% by weight or more, the heat resistance can be further enhanced. Also, by making the use amount ratio of L- or D-lactic acid 99% by weight or less, the decrease of the biodegradation rate can be prevented.

In the resins (1) and (2), the use amount ratio of the saccharide is preferably 0.01 to 20% by weight. By making the use amount ratio of the saccharide 0.01% by weight or more, the control of the biodegradation rate and melt viscosity are facilitated. Also, by making the use amount ratio of the saccharide 20% by weight or less, coloration can be prevented and the resin strength can be further enhanced.

In this connection, in the copolymer resins (1) and (2), the kinds of the saccharide may be the same or different from each other.

In the invention, the resins (1) and (2) according to any of the embodiments can be synthesized by employing known various polymerization methods, but it is preferred to synthesize them by a solvent-free direct polymerization method. That is, they can be synthesized by charging the above reaction components into a reaction vessel, adding a reaction catalyst, and heating, stirring, and reacting them under reduced pressure. The reaction catalyst to be used at that time may be any of the catalysts to be used in usual polyester polymerization, but is preferably a catalyst having excellent hydrolysis resistance and catalytic activity since starting lactic acid sometimes contains a large amount of water. Examples of such catalyst include organotin compounds, e.g., monoalkyltin derivatives and dialkyltin derivatives, specifically, monobutyltin oxide and 1,3-disubstituted 1,1,3,3-tetraorganodistannoxanes, and of these, monobutyltin oxide is preferred.

Each of the resins (1) and (2) thus obtained preferably has a weight-average molecular weight of 1,000 to 10,000,000.

In the resins (1) and (2), by making the weight-average molecular weight 1,000 or higher, the heat resistance and mechanical strength are further improved. Also, by making the weight-average molecular weight 10,000,000 or lower, excessive increase of the melt viscosity is inhibited and thus homogeneous dispersion of each starting material is achieved.

Moreover, the resins (1) and (2) according to any of the embodiments can be homogeneously mixed using a known resin mixing machine such as a single- or twin-screw extruder or a kneader. Alternatively, each of the resins (1) and (2) may be pelletized and the pellets may be dry blended together, followed by mixing and molding in an injection molding machine. In this connection, the injection molding of the biodegradable resin composition of the invention will be described below. In case of a small amount, each resin may be dissolved in an organic solvent, followed by mixing both of the solutions and drying.

As for the mixing ratio of the resin (1) and the resin (2), the amount of the resin (2) is preferably 1 to 100 parts by weight, more preferably 10 to 70 parts by weight, relative to 100 parts by weight of resin (1). Within the range, the heat resistance can be further enhanced.

The biodegradation rate and melt viscosity of the biodegradable resin composition of the invention can be easily controlled. For example, the biodegradation rate can be controlled by adjusting the addition amount of starch, polyhydric alcohol and polybasic carboxylic acid, and the melt viscosity can be controlled by adjusting the addition amount of starch.

The biodegradable resin composition of the invention has an improved crystallization rate, i.e., an increased crystallization rate. Thereby, crystallization is rapidly completed during the molding step of the composition and thus heat deformation of the resulting molded article is remarkably inhibited. In general, polylactic acid-based resins have a glass transition temperature (Tg) of 50 to 60° C., a crystallization temperature of 100 to 120° C., and a melting point of 170 to 180° C., and hence the molded articles of the polylactic acid-based resins are softened and distorted when they are left on standing at a temperature equal to or higher than the glass transition temperature. However, molded articles in which crystallization has sufficiently proceeded are not distorted by heat below their melting point. It can be assumed that the reason for the achievement of the rapid crystallization is as follows. Since the composition of the invention comprises the L-lactic acid unit-containing resin (1) and the D-lactic acid unit-containing resin (2), the resins (1) and (2) form eutectic crystals by heat at the molding and those crystals act as nuclei for the crystallization to thereby give rapid crystallization.

To the biodegradable resin composition of the invention, if necessary, various inorganic fillers such as fumed silica, wet silica, carbon black, talc, mica, clay, alumina, and graphite may be added for the purpose of improving the moldability, resin strength, and flame retardancy thereof. Also, for the purpose of increasing the impact resistance, a vegetable oil-based softener such as a fatty acid, soybean oil, rape oil, or rosin, cellulose powder, a fiber, natural rubber, factice, and the like may be added. Furthermore, for the purpose of foaming, an inorganic foaming agent such as sodium bicarbonate, ammonium bicarbonate, sodium carbonate, or ammonium carbonate, or an organic foaming agent such as an azodicarbonamide or p,p'-oxybisbenzenesulfonyl hydrazide may be added.

The molded article of the invention is described below.

The molded article of the invention can be obtained by injecting the above biodegradable resin composition into a heated mold having a predetermined shape to mold the resin composition.

The conditions for the injection molding may be suitably determined in consideration of the composition, molecular weights and mixing ratio of the resins (1) and (2), kinds of additives, and the like, and thus are not particularly limited. For example, there can be used the following conditions: a cylinder temperature of 160 to 180° C., an injection pressure of 45 to 70 kg/cm$^2$, an injection time of 0.5 to 10 seconds, and a nozzle temperature of 175 to 185° C.

The heating temperature of the mold is preferably 90 to 130° C. By making the mold temperature 90° C. or higher, the heat resistance of the resulting molded article can be further improved, for example, elevation of the heat deformation temperature thereof can be achieved. By making the mold temperature 130° C. or lower, the curing time of the biodegradable resin composition is shortened and thus production cost can be suppressed.

In this connection, the holding time (cooling time) of the injection-molded biodegradable resin composition in the mold is preferably 60 to 180 seconds.

EXAMPLES

The present invention will be illustrated in greater detail with reference to the following Examples, but the invention should not be construed as being limited thereto.

Example 1

Preparation of a Copolymer Resin Obtainable by Copolymerizing at Least L-lactic Acid, a Polyhydric Alcohol and a Polybasic Carboxylic Acid (Resin (1))

Into a 90 L-volume inverted conical ribbon-impeller reactor equipped with a refluxing column were charged 25 kg of 90% L-lactic acid, 7.8 kg of polypropylene glycol (Mw=2,000), 0.5 kg of citric acid, and 15 g of monobutyltin oxide as a catalyst, and they were reacted at a reaction temperature of 190° C. under a gradually increasing vacuum of 9 kPa (70 Torr) to 0.01 kPa (0.1 Torr) at an impeller rotation number of 130 rpm for 22 hours. The weight-average molecular weight of the resulting resin (1) was found to be about 2,000,000 and the melting point (mp) was 121° C.

Preparation of a Copolymer Resin Obtainable by Copolymerizing at Least D-lactic Acid, a Polyhydric Alcohol and a Polybasic Carboxylic Acid (Resin (2))

Into a 500 mL-volume separable flask equipped with an air-cooler of 450 mm and an external stirring apparatus were charged 200 g of D-lactic acid, 62.4 g of polypropylene glycol (Mw=2,000), 4 g of citric acid, and 0.1 g of monobutyltin oxide as a catalyst, and the whole was heated with stirring at a reaction temperature of 190° C. under a gradually increasing vacuum of 9 kPa (70 Torr) to 0.01 kPa (0.1 Torr) for 22 hours. The weight-average molecular weight of the resulting resin (2) was found to be about 30,000 and the melting point (mp) was 128° C.

Preparation of the Composition of the Invention

In a 500 mL-volume separable flask equipped with an external stirring apparatus were placed the resins (1) and (2) in an amount of 100 g each and after replacement of the atmosphere in the flask with nitrogen, the whole was stirred at 190° C. for 30 minutes and then cooled. The melting point (mp) of the resulting composition was found to be 185° C. and it was confirmed that the composition had an excellent heat resistance.

When the composition was buried in the earth for 2 months, it was also confirmed that the composition was biodegraded.

Example 2

Preparation of a Copolymer Resin Obtainable by Copolymerizing at Least L-lactic Acid and a Saccharide (Resin (1))

Into a 90 L-volume inverted conical ribbon-impeller reactor equipped with a refluxing column were charged 30 kg of 90% L-lactic acid, 30 g of corn starch, and 15 g of monobutyltin oxide as a catalyst, and they were reacted at a reaction temperature of 190° C. under a gradually increasing vacuum of 9 kPa (70 Torr) to 0.01 kPa (0.1 Torr) at an impeller rotation number of 130 rpm for 22 hours. The weight-average molecular weight, melting point (mp), and glass transition temperature of the resulting resin (1) were found to be 480,000, 155° C., and 51° C., respectively.

Preparation of a Copolymer Resin Obtainable by Copolymerizing at Least D-lactic Acid and a Saccharide (Resin (2))

Into a 500 mL-volume separable flask equipped with an air-cooler of 450 mm and an external stirring apparatus were charged 200 g of D-lactic acid, 0.2 g of corn starch, 4 g of citric acid, and 0.1 g of monobutyltin oxide as a catalyst, and the whole were heated with stirring at a reaction temperature of 190° C. under a gradually increasing vacuum of 9 kPa (70 Torr) to 0.01 kPa (0.1 Torr) for 22 hours. The weight-average molecular weight, melting point (mp), and glass transition temperature (Tg) of the resulting resin (2) were found to be 120,000, 148° C., and 47° C., respectively.

Preparation of the composition of the Invention

In a 500 mL-volume separable flask equipped with an external stirring apparatus were placed the resins (1) and (2) prepared in the above in an amount of 100 g each and after replacement of the atmosphere in the flask with nitrogen, the whole was stirred at 190° C. for 30 minutes and then cooled.

The melting point (mp) and glass transition temperature (Tg) of the resulting composition was found to be 211° C. and 59° C., respectively and it was confirmed that the composition had an excellent heat resistance.

When the composition was buried in the earth for 2 months, it was also confirmed that the composition was biodegraded.

Example 3

The resins (1) and (2) obtained with blending composition and under reaction conditions shown in the following Table 1 were dry blended in blending ratios (part by weight) shown in the following Table 2 and then were mixed in a KRC kneader (a twin-screw kneader) manufactured by Kurimoto K.K. to obtain resin compositions.

TABLE 1

| Item | Resin (1) | Resin (2) |
|---|---|---|
| (Blending composition) | | |
| L-Lactic acid (mfd. by Purac) | 30 kg | — |
| D-Lactic acid (mfd. by Purac) | — | 30 kg |
| Starch (corn starch) | 30 g | 30 g |
| Monobutyltin oxide | 15 g | 15 g |
| (Reaction conditions) | 140° C. × 3 h, 70 Torr | 140° C. × 3 h, 70 Torr |
| | 195° C. × 3 h, 70 Torr | 195° C. × 3 h, 70 Torr |
| | 195° C. × 3 h, 4 Torr | 195° C. × 3 h, 4 Torr |
| | 195° C. × 15 h, 0.1 Torr (24 hours in total) | 195° C. × 13 h, 0.1 Torr (22 hours in total) |
| Mw (weight-average molecular weight) | 230,000 | 210,000 |

(2) alone and thus is judged to have an excellent heat resistance. Moreover, when the resin compositions No. 1 to 9 were buried in the earth for 2 months, it was also confirmed that all the compositions No. 2 to 9 obtained by mixing the resins (1) and (2) were biodegraded.

Example 4

Preparation of a Copolymer Resin Obtainable by Copolymerizing at Least L-lactic Acid and a Saccharide (Resin (1))

Into a 90 L-volume inverted conical ribbon-impeller reactor equipped with a refluxing column were charged 30 kg of 90% L-lactic acid, 30 g of corn starch, and 15 g of monobutyltin oxide as a catalyst, and they were reacted at a reaction temperature of 190° C. under a gradually increasing vacuum of 9 kPa (70 Torr) to 0.01 kPa (0.1 Torr) at an impeller rotation number of 130 rpm for 22 hours. The weight-average molecular weight of the resulting resin (1) were found to be 210,000.

Preparation of a Copolymer Resin Obtainable by Copolymerizing at Least D-lactic Acid and a Saccharide (Resin (2))

Into a 90 L-volume inverted conical ribbon-impeller reactor equipped with a refluxing column were charged 30 kg of 90% D-lactic acid manufactured by Purac, 30 g of corn starch, and 15 g of monobutyltin oxide as a catalyst, and they were reacted at a reaction temperature of 190° C. under a gradually increasing vacuum of 9 kPa (70 Torr) to 0.01 kPa (0.1 Torr) at an impeller rotation number of 130 rpm for 22 hours. The weight-average molecular weight of the resulting resin (2) were found to be 220,000.

Preparation of the Composition of the Invention

The resulting resins (1) and (2) were dry blended in blending ratios (part by weight) shown in the following Table 3 and then were mixed in a KRC kneader (a twin-screw extruder) manufactured by Kurimoto K.K. to obtain resin compositions

TABLE 2

| | No. | | | | | | | | |
|---|---|---|---|---|---|---|---|---|---|
| | 1 | 2 | 3 | 4 | 5 | 6 | 7 | 8 | 9 |
| Resin (1) | 100 | 80 | 70 | 60 | 50 | 40 | 30 | 20 | — |
| Resin (2) | — | 20 | 30 | 40 | 50 | 60 | 70 | 80 | 100 |
| Melting point (° C.)[*1] | 152 | 200 | 201 | 205 | 215 | 214 | 209 | 209 | 147 |
| Crystallization temperature of crystallized sample (° C.)[*2] | — | 100.2 | — | — | — | — | — | — | — |
| Melting point of crystallized sample (° C.)[*2] | 152.9 | 198.8 | 204.3 | 206.5 | 208.0 | 206.1 | 204.5 | 200.1 | 144.2 |
| Crystallization temperature of non-crystallized sample (° C.)[*2] | 112.4 | 97.6 | 91.7 | 91.8 | 98.2 | 101.2 | 106.3 | — | — |
| Melting point of non-crystallized sample (° C.)[*2] | 150.3 | 188.6 | 188.6 | 201.1 | 181.8 | 184.4 | 185.9 | — | — |

[*1] It was measured using a flow tester CFT-500C manufactured by Shimadzu Corporation.
[*2] It was measured using a thermometric analysis apparatus manufactured by PERKIN-ELMER.
Conditions for preparing crystallized samples: Samples were dried under vacuum at 50° C. for 3 days.
Conditions for preparing non-crystallized samples: After heated at 220° C. in nitrogen gas and completely melted, samples were rapidly cooled in liquid nitrogen.

From the above Table 2, each of the resin compositions obtained by mixing the resins (1) and (2) has a remarkably high melting point as compared with either of the resin (1) or (pellets), whose melting points and crystallization rates were measured. The evaluation results of each resin composition were also shown in the following Table 3.

Moreover, when the compositions were buried in the earth for 2 months, it was also confirmed that they were biodegraded.

In this connection, the crystallization rate was judged as follows.

No. 1 shape of JIS K7113 having a thickness of 4 mm was molded under conditions of a mold temperature of 90° C. and a cooling time of 1 minute. The molded article was placed on characters of Mincho font in 10.5 point printed on a white copy paper. Then, the case that the characters were easily readable through the molded article was judged to be small crystallization rate, the case that the characters were not easily readable owing to the turbidity was judged to be medium crystallization rate, and the case that the characters were not readable at all was judged to be large crystallization rate.

Injection Molding Conditions

Injection molding machine used: Trade name SAV-30 manufactured by Sanjo Seiki Co., Ltd.

Injection pressure: 55 kg/cm$^2$

Injection time: 5 seconds

Cylinder temperature: 170° C.

Nozzle temperature: 180° C.

Heat deformation temperature according to JIS K7191 was measured on the resulting molded article using an automatic heat distortion tester manufactured by Yasuda Seiki K.K. In addition, maximum tensile strength and elongation at break according to JIS K7113 were also measured. The results are shown in Table 5.

TABLE 3

| | No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Resin (1) | 100 | 100 | 100 | 100 | 100 | 100 | 100 | 100 | 100 | 100 | 100 | — |
| Resin (2) | — | 1 | 5 | 11 | 25 | 43 | 67 | 100 | 150 | 230 | 400 | 100 |
| Melting point (° C.)* | 152 | 161 | 161 | 163 | 200 | 201 | 205 | 215 | 214 | 209 | 209 | 147 |
| Crystallization rate | Small | Small | Large | Large | Large | Large | Large | Large | Large | Large | Large | Small |

*It was measured using a flow tester CFT-500C manufactured by Shimadzu Corporation.

Example 5

Procedures were repeated as in Example 4 except that a commercially available homopolymer of L-lactic acid (Lacea H-100J manufactured by Mitsui Chemical, Inc., weight-average molecular weight: 180,000) was used as the resin (1). The results are shown in Table 4.

TABLE 4

| | No. | | | | | |
|---|---|---|---|---|---|---|
| | 13 | 14 | 15 | 16 | 17 | 18 |
| Resin (1) | 100 | 100 | 100 | 100 | 100 | 100 |
| Resin (2) | — | 1 | 3 | 5 | 11 | 25 |
| Melting point (° C.) | 183 | 182 | 188 | 187 | 187 | 200 |
| Crystal-lization rate | Small | Small | Medium | Large | Large | Large |

Note:
It is possible to elevate melting point further, but at that time, the molding temperature becomes close to the decomposition temperature of polylactic acid.

Example 6

A homopolymer of L-lactic acid (Lacea H-100J manufactured by Mitsui Chemical, Inc.) and the resin (2) of Example 4 were dry blended in a mixing ratio shown in Table 5 below and the blend was injection molded into such a mold that the resulting molded article became a rod having a size of 100 mm×12 mm×4 mm under the injection conditions shown below. The mold temperature and the holding time (cooling time) of the resin in the mold are shown in Table 5. After cooling was completed, it was confirmed that a solidified molded article having a predetermined shape was obtained when the mold was opened.

TABLE 5

| | No. | | | | | |
|---|---|---|---|---|---|---|
| | 19 | 20 | 21 | 22 | 23 | 24 |
| Resin (1) | 100 | 100 | 100 | 100 | 100 | 100 |
| Resin (2) | — | — | 10 | 10 | 20 | 20 |
| Mold temperature (° C.) | 30 | 110 | 110 | 30 | 110 | 30 |
| Cooling time (sec) | 30 | Impossible to mold | 120 | 30 | 120 | 30 |
| Maximum tensile strength JIS K7113 (kgf/cm$^2$) | 640 | Impossible to mold | 610 | 410 | 428 | 313 |
| Elongation at break JIS K7113 (%) | 4.2 | Impossible to mold | 1.9 | 2.1 | 1.5 | 2.0 |
| Heat deformation temperature JIS K7191 (° C.) | 53 | Impossible to mold | 136 | 53 | 139 | 52 |

The values of the resins (1) and (2) are expressed as parts by weight.
Resin (1): a homopolymer of L-lactic acid (Lacea H-100J manufactured by Mitsui Chemical, Inc.)

As can be seen from Table 5, molding with a high-temperature mold could not be accomplished in the case where the resin (2) was not used (see No. 20). Contrary, in the case where the resin (2) was blended with the resin (1), molding with a high-temperature mold could be accomplished (see Nos. 21 and 23). From the comparisons between No. 22 and No. 21 and between No. 24 and No. 23, it can be seen that the heat deformation temperature of the resulting molded article was largely improved in the case of injection molding with a high-temperature (110° C.) mold, as compared to the case with a low-temperature (30° C.) mold.

Additionally, although the maximum tensile strength and the elongation at break were slightly deteriorated as the blended amount of the resin (2) was increased (comparison between No. 21 and No. 23, or comparison between No. 22 and No. 24), the degree of the deterioration is within a level of practically acceptable.

Example 7

Procedures in Example 6 were repeated to measure heat deformation temperature except that the biodegradable resin composition No. 21 in Example 6 was used, and that the mold temperature was varied in the range of 25 to 110° C. The results are shown in FIG. 1.

From FIG. 1, it is understood that heat deformation temperature is improved when the mold temperature is 90° C. or higher.

In the above Examples, only the cases where the L-lactic acid unit-containing resin (1) is a copolymer resin obtainable by copolymerizing at least D-lactic acid, a polyhydric alcohol and a polybasic carboxylic acid, and the D-lactic acid unit-containing resin (2) is a copolymer resin obtainable by copolymerizing at least D-lactic acid, a polyhydric alcohol and a polybasic carboxylic acid; and the cases where the L-lactic acid unit-containing resin (1) is a homopolymer or a copolymer resin obtainable by copolymerizing at least L-lactic acid and a saccharide, and the D-lactic acid unit-containing resin (2) is a copolymer resin obtainable by copolymerizing at least D-lactic acid and a saccharide are described, but the invention is not limited thereto. That is, the resin composition of the invention may be a composition wherein the L-lactic acid unit-containing resin (1) is a copolymer resin obtainable by copolymerizing at least D-lactic acid, a polyhydric alcohol and a polybasic carboxylic acid, and the D-lactic acid unit-containing resin (2) is a copolymer resin obtainable by copolymerizing at least D-lactic acid and a saccharide, or a composition wherein the L-lactic acid unit-containing resin (1) is a copolymer resin obtainable by copolymerizing at least L-lactic acid and a saccharide, and the D-lactic acid unit-containing resin (2) is a copolymer resin obtainable by copolymerizing at least D-lactic acid, a polyhydric alcohol and a polybasic carboxylic acid. Also, the combination of the resins is not limited thereto and may be any of other combinations.

According to the invention, there are provided a biodegradable resin composition which has an excellent heat resistance and whose biodegradation rate and melt viscosity can be controlled and a biodegradable resin molded article.

While the present invention has been described in detail and with reference to specific embodiments thereof, it will be apparent to one skilled in the art that various changes and modifications can be made therein without departing from the spirit and scope thereof.

This application is based on Japanese patent application Nos. 2003-130364 (filed May 8, 2003), 2003-184899 (filed Jun. 27, 2003) and 2003-411647 (filed Dec. 10, 2003), the contents thereof being herein incorporated by reference.

What is claimed is:

1. A biodegradable resin composition comprising an L-lactic acid unit-containing resin (1) and a D-lactic acid unit-containing resin (2);
   wherein the L-lactic acid unit-containing resin (1) is a homopolymer of L-lactic acid,
   wherein the D-lactic acid unit-containing resin (2) is a copolymer of D-lactic acid and a saccharide,
   wherein resin (2) is present in an amount of from 3 to 5 parts by weight per 100 parts by weight of resin, and
   wherein resin (2) contains units of said saccharide in an amount of from 0.01 to 20% by weight.

2. The biodegradable resin composition according to claim 1, wherein the saccharide of resin (2) is starch.

3. A biodegradable resin molded article, which is obtained by injecting the biodegradable resin composition of claim 1 into a heated mold having a predetermined shape, the heated mold having a heating temperature of 90 to 130° C.

4. The biodegradable resin composition according to claim 1, wherein resin (2) which is a copolymer of D-lactic acid and a saccharide contains units of said saccharide in an amount of about 0.1% by weight.

5. The biodegradable resin composition according to claim 1, wherein resin (2) consists of units derived from D-lactic acid and a saccharide.

* * * * *